Oct. 7, 1924.

S. L. SISTI

SIGNAL DEVICE

Filed Feb. 15, 1923    2 Sheets-Sheet 1

1,510,966

Inventor:
Salvatore L. Sisti,
By Dyrenforth, Lee, Chritton & Wiles,
Attys.

Oct. 7, 1924.
S. L. SISTI
SIGNAL DEVICE
Filed Feb. 15, 1923
1,510,966
2 Sheets—Sheet 2
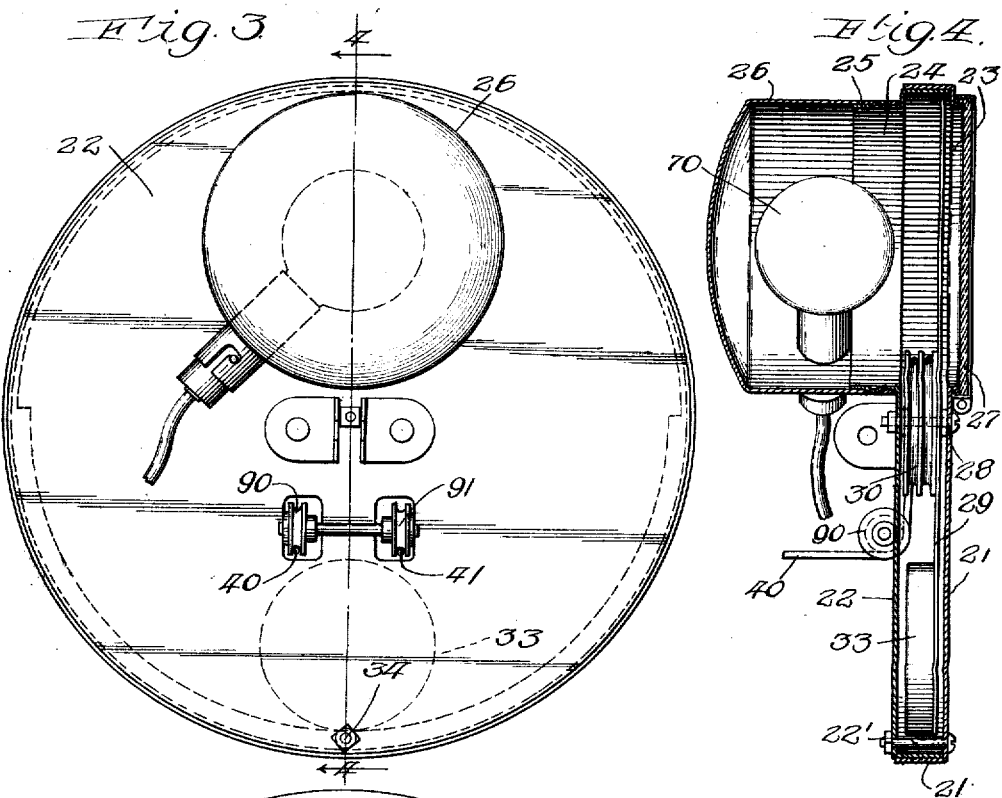
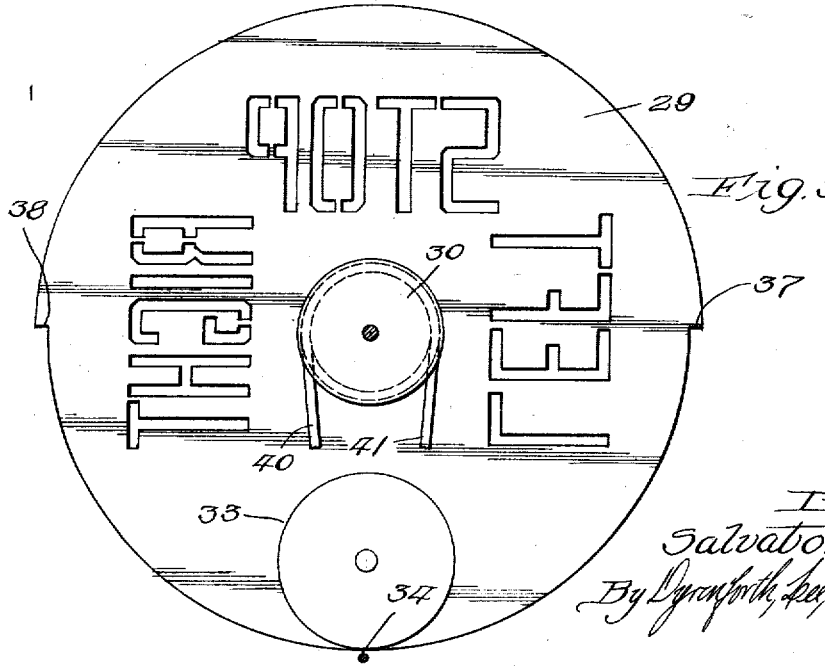
Inventor
Salvatore L. Sisti
By Dyrenforth, Lee, Chritton & Wiles
Attys.

Patented Oct. 7, 1924.

1,510,966

UNITED STATES PATENT OFFICE.

SALVATORE L. SISTI, OF CHICAGO, ILLINOIS.

SIGNAL DEVICE.

Application filed February 15, 1923. Serial No. 619,296.

*To all whom it may concern:*

Be it known that I, SALVATORE L. SISTI, a citizen of the United States, residing at 427 S. California Ave., Chicago, in the county of Cook and State of Illinois, have invented a new and useful Improvement in Signal Devices, of which the following is a specification.

This invention relates to improvement in signal devices and more especially to a signal device especially adapted for a vehicle, such as a motor vehicle, for indicating to following drivers the turns and stops intended to be made by the vehicle carrying the device. My improved signal device is simple in construction and can be easily and cheaply made. It is adapted for ready attachment to a vehicle, and is so designed that it may be both automatically and manually operated. It is also so constructed that it may carry such tags or emblems as may be desired. For example, the vehicle license tag may be attached to the device.

Other features and advantages of my device will appear more fully as I proceed with my specification.

Figure 1:
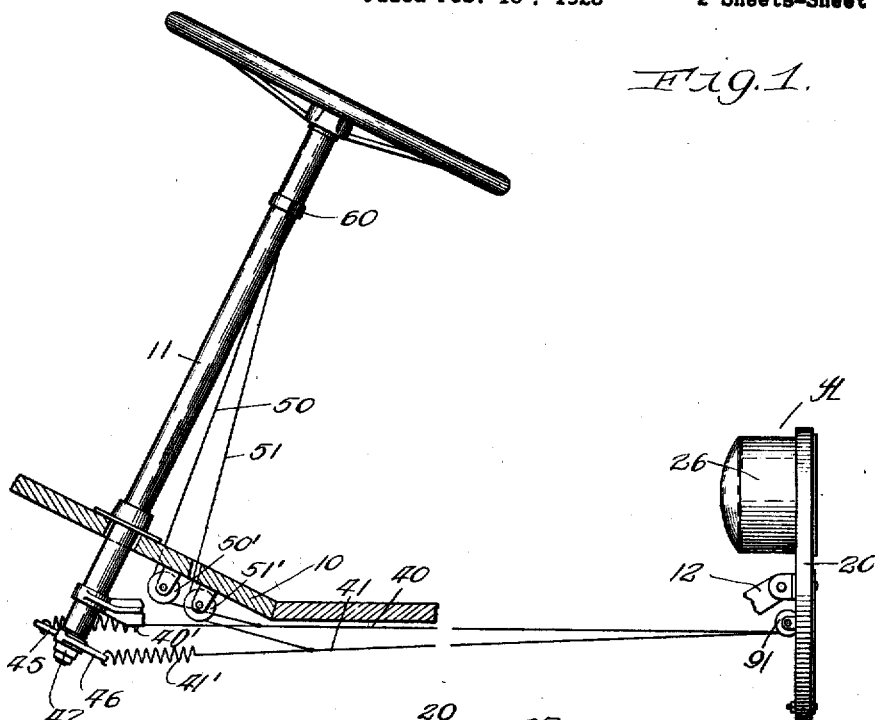
Figure 2:
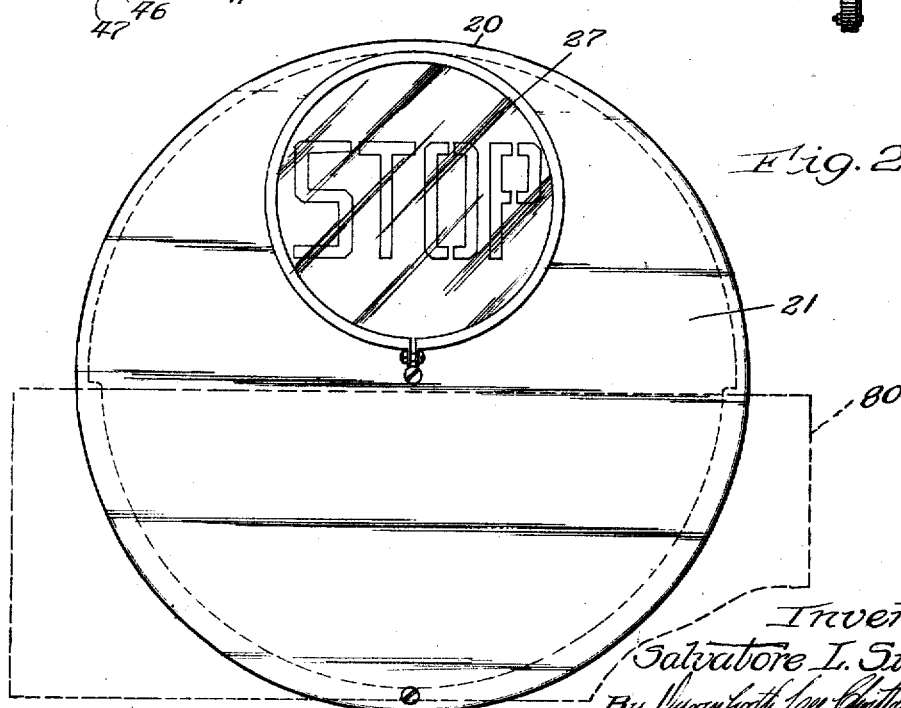

In that form of device embodying the features of my invention shown in the accompanying drawings, Fig. 1 is a view in side elevation of a signal device showing the method of attaching the same to a motor vehicle, Fig. 2 is a view of a signal device in rear elevation, Fig. 3 is a view of the same in front elevation, Fig. 4 is a view taken as indicated by the line 4 of Fig. 3, and Fig. 5 is a view of the same from the front with the cover removed.

As shown in the drawings, 10 indicates the floor-board of a motor vehicle. 11 indicates the steering column. The signal device indicated in general by A is attached at the rear of the vehicle to the mudguard, body, or other suitable support, in any desired manner such as by means of a bracket 12.

The signal device comprises in general a flat circular housing or casing 20, formed in any suitable manner such as by means of a back plate 21 and front plate 22, having telescoping flanges 21' and 22' respectively. The back plate 21 is provided at the top with a circular opening 23 having a diameter substantially equal to one half of the diameter of the plate itself. Directly opposite this opening 23, the forward plate 22 is provided with a similar registering opening 24, of substantially the same size, having a forwardly projecting flange 25 which carries a cylindrical lamp housing 26. The opening 23 is covered by a circular piece of glass preferably of the color red, as indicated by 27.

Rotatably mounted within the casing 20, on a centrally arranged pivot 28 is a metal disk 29, having cut out to form stencils thereon the words "Stop," "Left" and "Right," as shown in Fig. 5. The disk 29 is provided with a centrally arranged pulley 30 having two grooves as shown. A counterweight 33 at the lower edge of the disk 29, is also provided for the purpose of yieldingly retaining the disk in its normal position. A bolt 34 through the lower edge of the casing 20 is also provided for assisting and holding the two parts of the casing together. This bolt also acts as a stop to limit rotation of the disk 29 by its engagement with the two shoulders 37 and 38.

The disk 29 is rotated by means of the two cables 40 and 41 respectively which are wrapped part way around the grooves on the pulley 30 and fastened at their ends. These two cables 40 and 41 are led forwardly and attached to two spiral springs 40' and 41' which in turn are fastened to two arms 45 and 46, attached to the bottom of the steering post 47, which rotates inside of the steering column 11. By means of this construction, it will be seen that rotation of the steering post 47 to turn the vehicle to the right or left will operate through the cables 40 and 41 to rotate the disk 29, to move the word "Left" or "Right" opposite the opening 23 in the back plate 21. When the steering wheels are straightened, the disk 29, will be in its normal position with the word "Stop" opposite the opening 23. The cables 40 and 41 are also provided with branch cables 50 and 51 leading over the pulleys 50' and 51' respectively, with their ends attached to the steering column 11, slightly below the steering wheel as indicated by 60. By means of this construction, the driver of the vehicle, may pull either of the cables 50 or 51 to cause the disk 29 to rotate, even though there is no turning of the steering wheel.

Within the lamp housing 26, is provided an incandescent electric bulb 70 which may be of the ordinary kind heretofore commonly used in connection with stop signals. This bulb is so connected with an automatic switch in the usual manner, so that it normally will be out but will light when the brakes are applied. This form of attachment and construction is old in the art and consequently will not be described here.

The lower part of the casing 20 below the opening 23 may carry any suitable emblem or device such as a vehicle license tag as indicated by 80.

The cables 40 and 41 are led from the pulley 30 out of the casing 20 over the two pulleys 90 and 91.

The operation of my improved device is as follows.

When the vehicle is running freely, without the application of brakes, the light 70 will not be burning and consequently nothing will be visible through the red glass 27 from the rear of the vehicle. When the brakes are applied to slow down the vehicle, the light 70 will burn, displaying the word "Stop" through the red glass at the rear. If the vehicle is turned to the right or the left by rotation of the steering column 47, the disk 29 will be turned to display the word "Right" or the word "Left," depending upon the direction of the turn. If desired, the operator can pull either of the cables 51 or 50 to turn the disk 29 to display the word "Right" or "Left" to indicate the contemplated turn.

While I have shown and described certain embodiments of my invention, it is to be understood that it is capable of many modifications. Changes therefore in the construction and arrangement may be made without departing from the spirit and scope of the invention as disclosed in the appended claims, in which it is my intention to claim all novelty inherent in my invention as broadly as possible in view of the prior art.

What I claim as new and desire to secure by Letters Patent, is:

1. In a device of the character described, a cylindrical casing provided with an opening at the rear, a disk rotatably supported in the casing provided with signal words adapted to be brought into registry with the opening by rotation of the disk, and means for automatically or manually rotating the disk, said means comprising two cables attached to the disk and leading forward with their forward ends attached to arms arranged on the steering post, said cables also provided with branches leading upwardly to points within reach of the vehicle operator.

2. A device of the character described, comprising a cylindrical casing having an opening at the rear, an electric lamp arranged opposite and in front of said opening, a circular disk rotatably mounted in said casing, having its periphery lying between said lamp and said opening, said disk being provided at its periphery with signal words adapted to be moved, by rotation of said disk, into position between said lamp and said opening, and means for automatically rotating said disk, said means comprising two cables attached to the disk and leading forward with their forward ends attached to arms arranged on the steering post.

3. A device of the character described, comprising a cylindrical casing having an opening at the rear, an electric lamp arranged opposite and in front of said opening, a circular disk rotatably mounted in said casing, having its periphery lying between said lamp and said opening, said disk being provided at its periphery with signal words adapted to be moved by rotation of said disk, into position between said lamp and said opening, and means for automatically or manually rotating said disk, said means comprising two cables attached to the disk and leading forward with their forward ends attached to arms arranged on the steering post, said cables also provided with branches leading upwardly to points within reach of the vehicle operator.

In witness whereof I have hereunto set my hand and seal this 12th day of February, 1923.

SALVATORE L. SISTI. [L. S.]